3,434,119
MAGNETIC MEMORY EMPLOYING
STRESS WAVE
Lubomyr S. Onyshkevych, Trenton, N.J., assignor to
Radio Corporation of America, a corporation of Delaware
Filed Aug. 5, 1964, Ser. No. 387,586
U.S. Cl. 340—173                                      6 Claims
Int. Cl. G11b 5/00, 3/00

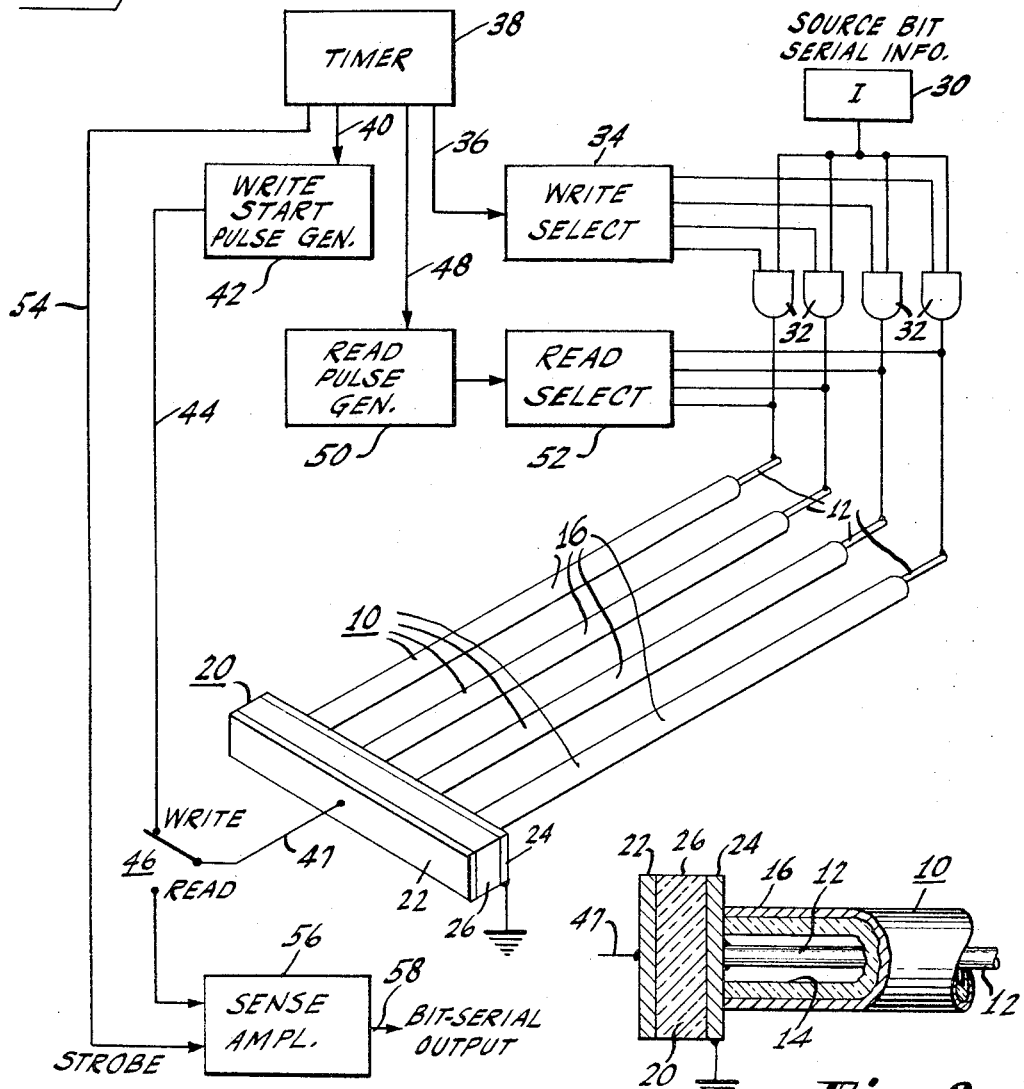
Fig. 1.
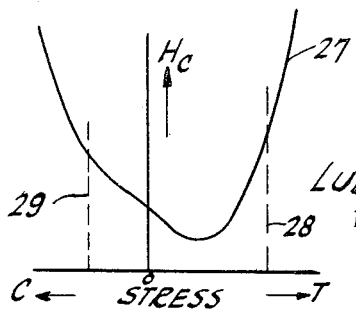
Fig. 2.
Fig. 3.
INVENTOR.
LUBOMYR S. ONYSHKEVYCH
BY Carl V. Olson
Attorney United States Patent Office 3,434,119
Patented Mar. 18, 1969

ABSTRACT OF THE DISCLOSURE

A memory array includes a plurality of parallel elongated paths each including an electric conductor, a sonic stress wave conductor, and switchable magnetic material physically intimate with the electric conductor and the stress wave conductor. An electromechanical transducer is mechanically coupled to all of the stress wave conductors. For writing, means are provided to electrically pulse the transducer to propagate a stress wave along all of the stress wave conductors, and to apply electric bit-serial information signals to a selected one of the electric conductors in time-position synchronism with the propagation of the stress wave. To reproduce recorded information, an electric pulse is applied to a selected one of the electric conductors to cause a switching of stored information fluxes and the generation of corresponding stress information signals on the stress conductor. The stress information signals propagate along the stress conductor to the electromechanical transducer where they are translated to corresponding electrical bit-serial information signals.

---

This invention relates to information storage systems, and particularly to memories in which access in individual storage locations is accomplished by means of stress waves propagated through magnetic material.

When a magnetic element is subjected to mechanical stress, changes occur in the magnetic characteristics of the material. For example, the coercive magnetizing force $H_c$ necessary to switch the direction of magnetization in the magnetic material is changed. If the magnetic material is anisotropic, changes also occur in the magnetizing force $H_k$ sufficient to provide saturation flux in the hard axis direction, and changes occur in the direction of the easy axis. An electric current pulse in a conductor linking the magnetic material may have an ampltiude which is sufficient to switch the direction of magnetic flux where the magnetic material is stressed but which is insufficient to switch flux where the magnetic material is unstressed. This phenomenon may be employed to record a plurality of information bits along an elongated magnetic memory by applying electric information signals to the conductor in time-position synchronism with the propagation of a sonic stress wave through the magnetic material. The reproducing of information signals from such known stress wave memories is accomplished by propagating another stress wave through the magnetic material and sensing the bit-serial electrical information signals induced on the electric conductor.

When it is desired to construct a stress wave memory having many information storage lines, it is necessary to provide means for selecting any one of the lines at any given time. This is usually accomplished by providing each stress wave path with an individual electromechanical transducer. The necessity of providing individual transducers and insuring the isolation of sonic stress waves in respective stress paths introduces practical construction difficulties which militate against a desired miniaturization of the memory.

It is an object of this invention to provide an improved stress wave memory wherein a single electromechanical transducer serves to simultaneously propagate stress waves through all of a plurality of stress wave information storage paths.

It is another object to provide an improved stress wave memory wherein the reproducing of information stored along a magnetic stress wave path is accomplished by an electric pulse which destructively switches all of the information-storing magnetic fluxes along a selected path to induce corresponding stress information signals which are propagated along the stress path to a transducer where they are translated into corresponding electric bit-serial information signals.

It is a further object to provide an improved stress wave memory wherein the magnetic material is normally biased with a fixed stress to provide an improved stress-dependent magnetic characteristic.

In accordance with an example of the invention, a memory array includes a plurality of parallel elongated paths each including an electric conductor, a sonic stress wave conductor, and switchable magnetic material physically intimate with the electric conductor and the stress wave conductor. An electromechanical transducer is mechanically coupled to all of the stress wave conductors. Means are provided to electrically pulse the transducer to propagate a stress wave along all of the stress wave conductors, and to apply electric bit-serial information signals to a selected one of the electric conductors in time-position synchronism with the propagation of the stress wave. This accomplishes the recording of the information signals in the magnetic material along the selected path.

To reproduce recorded information, an electric pulse is applied to a selected one of the electric conductors to cause a switching of stored information fluxes and the generation of corresponding stress information signals on the stress conductor. The stress information signals propagate along the stress conductor to the electromechanical transducer where they are translated to corresponding electrical bit-serial information signals.

In the drawings:

FIG. 1 is a diagram of a magnetic stress wave memory array constructed according to the teachings of the invention;

FIG. 2 is an enlarged partially-sectioned fragmentary view of an electromechanical portion of the system of FIG. 1; and FIG. 3 is a chart of the relationship between a property of magnetic material and stress applied to the material which will be referred to in explaining the invention.

Referring in greater detail to FIGS. 1 and 2, there is shown a plurality of parallel elongated paths 10 each including an electric conductor 12, a sonic conductor 14 and a magnetic material 16 having a switchable magnetic flux characteristic. The stress wave conductor 14 may be made of glass or quartz, and the magnetic material 16 may be a magnetic material such as permalloy deposited with an appropriate thickness in intimate contact with the stress conductor 14. Alternatively, the stress conductor 14 and the magnetic material 16 may be constituted by a unitary homogenous material possessing both the desired magnetic and stress-conducting characteristics.

The parallel elongated paths 10 are illustrated as constituted by concentric cylindrical elements 12, 14 and 16. However, the parallel paths 10 may be constructed on a substrate by suitable known printing techniques. The substrate itself may constitute the stress wave conductor 14 for all parallel paths because it is not necessary to provide sonic isolation between the several parallel paths. The magnetic material 16 may also, if desired, be a continuous sheet or film, or the magnetic material 16 may be constituted by discrete individual patches of magnetic material. The electric conductors 12 must be discrete conductors which are electrically insulated from each other.

An electromechanical transducer 20 is mechanically coupled to the sonic stress wave conductors 14 of all of the parallel paths 10. The transducer 20 is illustrated as a piezoelectric transducer having electrical terminals 22 and 24 and having a piezoelectric crystal 26 interposed therebetween. The electric conductor 12 of each parallel path may be connected to the electrode 24 of the transducer 20 for the purpose of providing a convenient electrical return path through ground for currents in the conductor. The ends of the elongated paths 10 remote from the transducer 20 are provided with the usual stress-absorbing terminations (not shown) for the purpose of preventing reflections of the stress waves.

The stress conductor 14 and its intimately related magnetic material 16 is constructed so that a fixed stress bias is imparted to the magnetic material for the purpose of providing an improved relationship between a magnetic characteristic of the material and stress. FIG. 3 shows a chart illustrating changes in coercive force $H_c$ of a magnetic material with changes in stress, compressive stress C being plotted to the left and tensile stress T being plotted to the right. The curve 27 indicates that when tensile stress increases from a zero value of stress, the value of $H_c$ decreases and then increases. This indicates that the zero stress abscissa is an undesirable static condition from which to dynamically change the coercive force due to tensile stress.

An improved dynamic characteristic is obtained if the magnetic material is subjected to a fixed tensile stress bias having a value represented at 28. Then, dynamic changes in stress result in a nearly linear non-reversing change in coercive force over a considerable range of change in tensile stress. The same desirable improvement in the dynamic characteristic may be obtained by biasing the magnetic material with a compressive stress at a value designated 29.

The establishment of a desired fixed stress bias in the magnetic material 16 may be accomplished in any one of a number of different ways. For example, the magnetic material 16 may be deposited on the stress conductor 14 when the stress conductor is constrained in a stressed condition by means of clamping, tensioning or twisting fixtures. When the stress conductor is removed from the fixture, it returns to its normal condition and permanently stresses the magnetic material 16. The stress bias may also be established by depositing the magnetic material when the stress conductor is at an abnormally elevated or reduced temperature. On cooling, a stress bias is applied to the magnetic material. According to yet another method, the magnetic material 16 may be deposited on the stress conductor 14 in the presence of a magnetic field.

The storage of information in the magnetic flux in the magnetic material 16 may rely on stress-induced changes in the coercive force $H_c$ of the material, changes in the saturation magnetizing force $H_k$ in the hard axis direction, or changes in the direction of the easy axis in the material. The fixed bias imparted to the magnetic material 16 is of a nature, direction and amplitude to improve the magnetic characteristic relied upon for accessing any desired elemental memory location.

A source of bit-serial information signals 30 is connected through a plurality of gates 32 each having an output connected to a respective one of the conductors 12. Each of the gates 32 has a respective input from a write selection circuit 34 which is designed to enable any desired one of the gates 32. The write selection circuit 34 operates at a time determined by an output 36 from a timer circuit 38. The timer 38 has an output 40 to control the timing of a write start pulse generator 42. The output of generator 42 is applied over line 44 and through a write-read switch 46 to one terminal 22 of the electromechanical transducer 20. The described circuits and connections are employed when recording information in the memory array.

For the purpose of reproducing information stored in the memory, the timer 38 provides a timing pulse over line 48 to a read pulse generator 50. The output of the generator 50 is connected to any selected one of the electric conductors 12 by means of a read selection circuit circuit 52. The timer 38 may also supply a strobe signal over line 54 to a sense amplifier 56. The sense amplifier 56 may be connected by means of the switch 46 and lead 47 to the electric terminal 22 of the transducer 20.

According to another arrangement, the writing and reading functions of transducer 20 may be performed by two separate transducers both mechanically coupled to the stress conductors 14. In this case, one transducer is electrically coupled to the pulse generator 42 and the other is electrically coupled to the sense amplifier 56.

In the operation of the system of FIG. 1, information is recorded in a selected one of the parallel elongated paths 10 by first supplying an electric pulse from the write start pulse generator 42 over the lead 44 and through the switch 46 to the electromechanical transducer 20. The electric pulse causes the generation of the sonic pulse in the transducer 20 which is coupled to and propagated along all of the sonic conductors 14 of all of the parallel paths 10. Immediately after initiating the sonic pulse waves, the write selector circuit 34 enables a selected one of the gates 32. When the selected gate is enabled, a source 30 of bit-serial information signals is connected through the enabled gate to the electric conductor 12 of a corresponding selected one of the parallel paths 10.

The propagation of the stress wave through the stress conductors proceeds at the speed of sound in the material. This speed is slow compared with the almost instantaneous speed at which electric signals pass through the conductor 12. The bit-serial information signals from source 30 are timed to occur in time-position synchronism with the propagation of the sonic wave. Each electric information bit signal switches the magnetic flux at the simultaneously stressed point along the selected path.

The reproducing or reading of stored information along one elongated path 10 is accomplished by placing the write-read switch 46 in the read position to connect the sense amplifier 56 to the transducer 20, and by applying an electric pulse from the read pulse generator 50 through the read selection circuit 52 to a selected one of the conductors 12 of a selected one of the parallel paths 10. The read pulse applied through the selected conductor 12 causes a switching of all of the individual information storing fluxes along the selected line or path. The switching of information fluxes in the material 16 results in the generation of corresponding information stress pulses in the stress conductor 14. All of the information stress pulses are generated at the same instant and are initially distributed along the length of the stress conductor 14.

After the instant of generation of the information stress pulses, they propagate in both directions from their points of origin. The stress pulses propagated toward the terminated ends are absorbed without reflection. The information stress pulses propagated toward the transducer 20 arrive at the transducer in orderly sequence. Each information stress pulse arriving at the transducer 20 causes a mechanical flexing of the transducer which results in the generation of an electrical signal across the terminals 22 and 24 of the transducer. The generated electrical signals are coupled through the switch 46 to the input of the sense amplifier 56. The sense amplifier may, if desired, be strobed over line 54 from the timer 38 to sensitize the amplifier at successive moments of time corresponding with the arrival of information signals at the transducer 20. The output 58 of the sense amplifier 56 provides electric bit-serial information signals corresponding with the information previously stored in the magnetic flux along the selected path 10.

The described means, by which the magnetically stored information is reproduced from a selected path, includes means to apply an electric pulse to the electric conductor of the selected path, and means to sense electrical information signals generated by the transducer. This is in contrast to prior arrangements wherein the reproducing of stored information is accomplished by propagating a stress pulse through a path and sensing electrical signals induced on the electric conductor of the path. Electric current selection of a desired path for the reading of stored information, according to the invention, has constructional and operating advantages, particularly where large memory capacity is desired. The described system is also advantageous in that the reading process results in the clearing out of the stored information so that the memory locations are in good condition to receive new information for storage. If it is desired to write the information read from the memory back to its original storage location, it can be written back during the next memory cycle in the manner commonly employed with memories characterized by destructive read-out.

What is claimed is:

1. A memory comprising
an elongated path including an electric current conductor, a sonic stress wave conductor and switchable magnet material,
an electromechanical transducer mechanically coupled to said path,
means to electrically energize said transducer to propagate a stress wave along said path,
means to apply electric bit-serial information signals to said path in time-position synchronism with the stress wave from said transducer, whereby the information is stored in the magnetic flux along the selected path,
means to apply an electric pulse through said path to cause a switching of the stored information flux and the generation of corresponding stress information signals, whereby the stress information signals are then propagated along the path to said transducer where they are translated to corresponding electric bit-serial information signals, and
a sense amplifier coupled to the electric terminals of said transducer.

2. A memory array comprising
a plurality of parallel elongated paths each including an electric current conductor, a sonic stress wave conductor and switchable magnetic material,
an electromechanical transducer mechanically coupled to all of said paths,
means to electrically energize said transducer to propagate stress waves along all of said paths,
means to apply electric bit-serial information signals to a selected one of said paths in time-position synchronism with the stress wave from said transducer,
means to apply an electric pulse through a selected one of said paths to cause a switching of the stored information flux and the generation of corresponding stress information signals, and
means to derive electric bit-serial information signals from the electric terminals of said transducer.

3. A memory array comprising
a plurality of parallel elongated paths each including an electric current conductor, a sonic stress wave conductor and switchable magnetic material,
an electromechanical transducer mechanically coupled to all of said paths,
means to electrically energize said transducer to propagate stress waves along all of said paths,
means to apply electric bit-serial information signals to a selected one of said paths in time-position synchronism with the stress wave from said transducer whereby the information is stored in the magnetic flux along the selected path,
means to apply an electric pulse through a selected one of said paths to cause a switching of the stored information flux and the generation of corresponding stress information signals, whereby the stress information signals are then propagated along the path to said transducer where they are translated to corresponding electric bit-serial information signals, and
a sense amplifier coupled to the electric terminals of said transducer.

4. A memory array comprising
a plurality of parallel elongated paths each including an electric conductor, a sonic stress wave conductor and swtichable magnetic material,
an electromechanical transducer mechanically coupled to the stress wave conductor of all of said paths,
means to electrically energize said transducer to propagate stress waves along all of said paths,
means to apply electric bit-serial information signals to the electric conductor of a selected one of said paths in time-position synchronism with the stress wave from said transducer, whereby the information is stored in the magnetic material along the selected path,
means to apply an electric pulse through the electric conductor of a selected one of said paths to cause a switching of the stored information flux and the generation of corresponding stress information signals in the stress wave conductor, whereby the stress information signals are then propagated along the path to said transducer where they are translated to corresponding electric bit-serial information signals, and
a sense amplifier coupled to the electric terminals of said transducer.

5. A memory comprising
an elongated path including an electric conductor, a sonic stress wave conductor and switchable magnetic material physically initmate with stress wave conductor, said magnetic material being normally biased with a fixed stress resulting in a steep and non-reversing magnetic characteristic when positive and negative stress is superimposed on the bias stress,
an electromechanical transducer mechanically coupled to said stress wave conductor,
means to electrically energize said transducer to propagate a stress wave along said stress wave conductor,
means to apply electric bit-serial information signals to the electric conductor in time-position synchronism with the stress wave from said transducer,
means to apply an electric pulse through the electric conductor to cause a switching of stored information fluxes and the generation of corresponding stress information signals, and
a sense amplifier coupled to the electric terminals of said transducer.

6. A memory comprising
an elongated path including an electric conductor, a sonic stress wave conductor and switchable magnetic material physically initmate with said stress wave conductor, said magnetic material being normally biased with a fixed stress resulting in a steep and non-reversing magnetic characteristic when positive and negative stress is superimposed on the bias stress, an electromechanical transducer mechanically coupled to said stress wave conductor, means to electrically energize said transducer to propagate a stress wave along said stress wave conductor, and means to apply electric bit-serial information signals to the electric conductor in time-position synchronism with the stress wave from said transducer.

References Cited

UNITED STATES PATENTS 3,320,596  5/1967  Smith _____ 340—173

FOREIGN PATENTS 873,367  7/1961  Great Britain.

TERRELL W. FEARS, *Primary Examiner.*

U.S. Cl. X.R.

333—29; 340—174